J. C. KRAUSE.
BIT.
APPLICATION FILED DEC. 17, 1907.
917,951.
Patented Apr. 13, 1909.
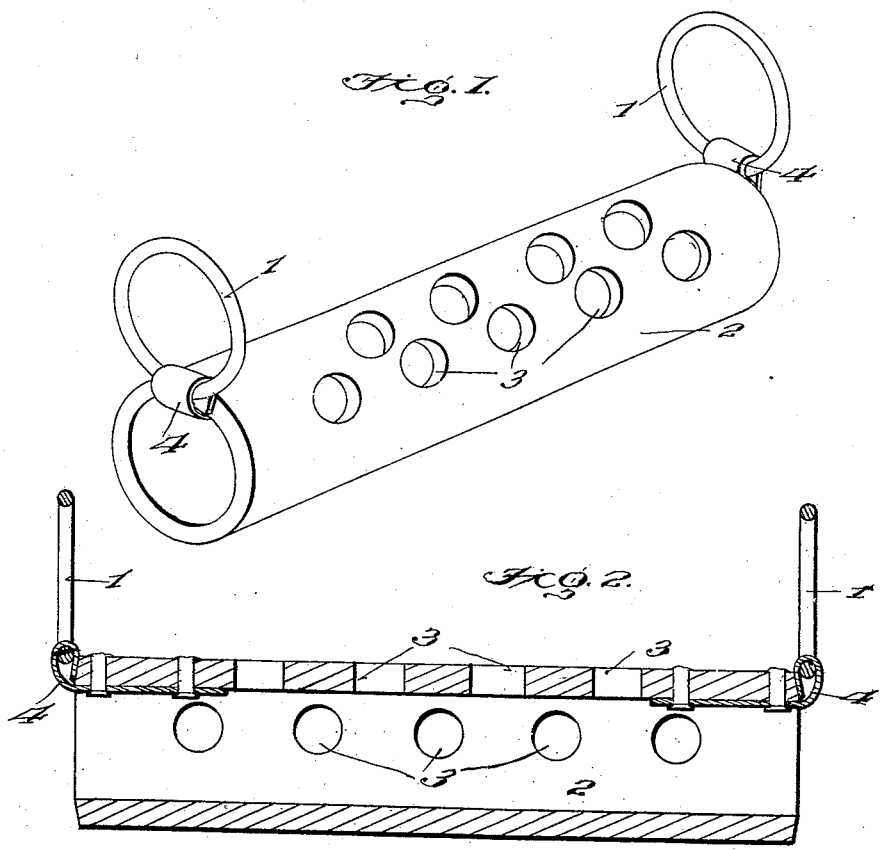
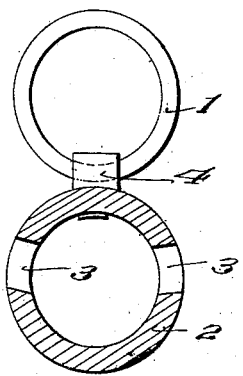
Witnesses
Inventor
J. C. Krause.
By
Attorneys

UNITED STATES PATENT OFFICE.

JACOB C. KRAUSE, OF CORDELL, OKLAHOMA.

BIT.

No. 917,951.     Specification of Letters Patent.     Patented April 13, 1909.

Application filed December 17, 1907. Serial No. 406,889.

*To all whom it may concern:*

Be it known that I, JACOB C. KRAUSE, a citizen of the United States, residing at Cordell, in the county of Washita and State of Oklahoma, have invented certain new and useful Improvements in Bits, of which the following is a specification.

The present invention provides a device to be inserted in the mouth of the animal suffering with bloat or colic, said device being in the nature of a bit and retained in place by suitable harness or gear.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a device embodying the invention. Fig. 2 is a central longitudinal section thereof. Fig. 3 is a transverse section, showing more clearly the relation of the perforations.

Corresponding and like parts are referred to in the following description and indicated in all the views of the drawings by the same reference characters.

The device is of peculiar form and is provided at opposite ends with rings 1 corresponding to the rings of an ordinary bridle bit and designed for the same purpose, namely, to receive the harness or gear for holding the device after being placed in position in the mouth of the animal.

An essential feature of the invention is that the mouth-piece 2 be tubular and open throughout its length and provided in its sides with perforations, or openings 3. It is also important that said mouth-piece be approximately of large diameter, that is, many times larger than the usual bit, so as to hold the jaws of the animal apart and keep the mouth open, with the result that the bloat or colic may be relieved by escape of the excess of air producing the pain.

The mouth-piece 2 usually consists of a length of tubing about an inch and a quarter in diameter and one side thereof, only, is provided with perforations or openings 3, said perforated side being designed to face inward so as to provide a ready escape for wind that may be ejected. It is important that the perforations or openings 3 be of a suitable size, usually three-eighths of an inch in diameter, to insure a ready discharge of the wind that may be thrown off.

The rings 1 may be attached to the ends of the mouth-piece in any manner, and, as shown, metal straps 4 are riveted or fastened at one end to the inner sides of the end portions of the mouth-piece and have their projecting ends rolled to provide eyes in which the rings 1 are fitted.

Stock affected with bloat or colic from any cause, may be successfully treated by inserting the device between the jaws thereof and holding the same in place by suitable harness or head gearing, not shown. The mouth being thus held open and by reason of the hollow structure of the mouth-piece and the perforations in the side facing the animal, the wind producing the bloat or colic is afforded an opportunity and induced to be thrown off, thereby relieving the trouble.

Having thus described the invention, what is claimed as new is:

A bit substantially as herein described, the same consisting of a tubular mouth piece, smooth upon its exterior throughout its length and having openings in its sides, rings at the ends of the mouth piece, and straps for securing the rings to the ends of the mouth piece, said straps having their outer ends formed into eyes to receive the rings, and bent to lie against the extremities of the mouth piece, and having their inner ends inserted in said mouth piece and secured against the inner walls thereof.

In testimony whereof I affix my signature in presence of two witnesses.

JACOB C. KRAUSE.

Witnesses:
     A. M. SHERBURNE,
     J. H. JOHNSON.